United States Patent
Thomas et al.

(10) Patent No.: US 10,455,966 B2
(45) Date of Patent: Oct. 29, 2019

(54) POTATO RICER

(71) Applicant: BREVILLE PTY LIMITED, Alexandria, New South Wales (AU)

(72) Inventors: Mark Thomas, Leichhardt (AU); Greg Upston, Ridgewood (AU)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 1062 days.

(21) Appl. No.: 14/438,216

(22) PCT Filed: Aug. 1, 2013

(86) PCT No.: PCT/AU2013/000858
§ 371 (c)(1),
(2) Date: Apr. 23, 2015

(87) PCT Pub. No.: WO2014/063180
PCT Pub. Date: May 1, 2014

(65) Prior Publication Data
US 2015/0265088 A1    Sep. 24, 2015

(30) Foreign Application Priority Data
Oct. 26, 2012   (AU) ................................ 2012904718

(51) Int. Cl.
*A47J 19/04*    (2006.01)
*A47J 42/12*    (2006.01)
(Continued)

(52) U.S. Cl.
CPC .............. *A47J 19/04* (2013.01); *A47J 42/12* (2013.01); *A47J 42/32* (2013.01); *A47J 43/044* (2013.01); *A47J 2043/04427* (2013.01)

(58) Field of Classification Search
CPC .......... A47J 19/04; A47J 43/044; A47J 43/27; A47J 43/07; A47J 19/00; A47J 42/12;
(Continued)

(56) References Cited

U.S. PATENT DOCUMENTS 2,385,966 A  *  10/1945  Bottinelli ................ A47J 19/04
                                                                    241/169.2
3,299,924 A       1/1967  Hanschitz
(Continued)

FOREIGN PATENT DOCUMENTS

| GB | 2456538 A | 7/2009 | |
| WO | WO 2007042635 A1 * | 4/2007 | .......... A47J 43/0711 |
| WO | WO-2012/071608 A1 | 6/2012 | |

OTHER PUBLICATIONS

Office Action for Chinese Patent Application No. 201380068043.7, dated Apr. 18, 2016.
(Continued)

*Primary Examiner* — Kenneth E Peterson
*Assistant Examiner* — Nhat Chieu Q Do
(74) *Attorney, Agent, or Firm* — Marshall, Gerstein & Borun LLP

(57) ABSTRACT

An accessory for a stick mixer comprises a coupling portion with an optional internal gearbox. In one embodiment, a leg assembly further comprises nested inner and outer legs. The inner leg carries a first array of openings and the outer leg carries a second array of openings. The inner and outer legs rotate relative to one another to produce third array of openings having variable sizes.

9 Claims, 15 Drawing Sheets

(51) Int. Cl.
*A47J 42/32* (2006.01)
*A47J 43/044* (2006.01)

(58) Field of Classification Search
CPC .. A47J 42/16; A47J 42/32; A47J 2043/04427; B01F 15/06
USPC .................................. 241/85, 86, 92, 169.1
See application file for complete search history.

(56) References Cited

U.S. PATENT DOCUMENTS

| | | | | |
|---|---|---|---|---|
| 8,046,921 | B2* | 11/2011 | Mastroianni | A47J 25/00 30/113.2 |
| 2005/0178865 | A1* | 8/2005 | Krause | B26D 7/32 241/169 |
| 2013/0200185 | A1* | 8/2013 | Wilson | A47J 19/04 241/27 |
| 2019/0117005 | A1* | 4/2019 | Kettavong | A47J 27/12 |

OTHER PUBLICATIONS

Notice to Grant for Chinese Patent Application No. 201380068043.7, dated Oct. 27, 2016.
Notice of Acceptance for Australian Patent Application No. 2013334468, dated Aug. 22, 2017.
International Search Report and Written Opinion for PCT/AU2013/000858, dated Aug. 23, 2013.
International Preliminary Report on Patentability for PCT/AU2013/000858, dated Apr. 28, 2015.

* cited by examiner

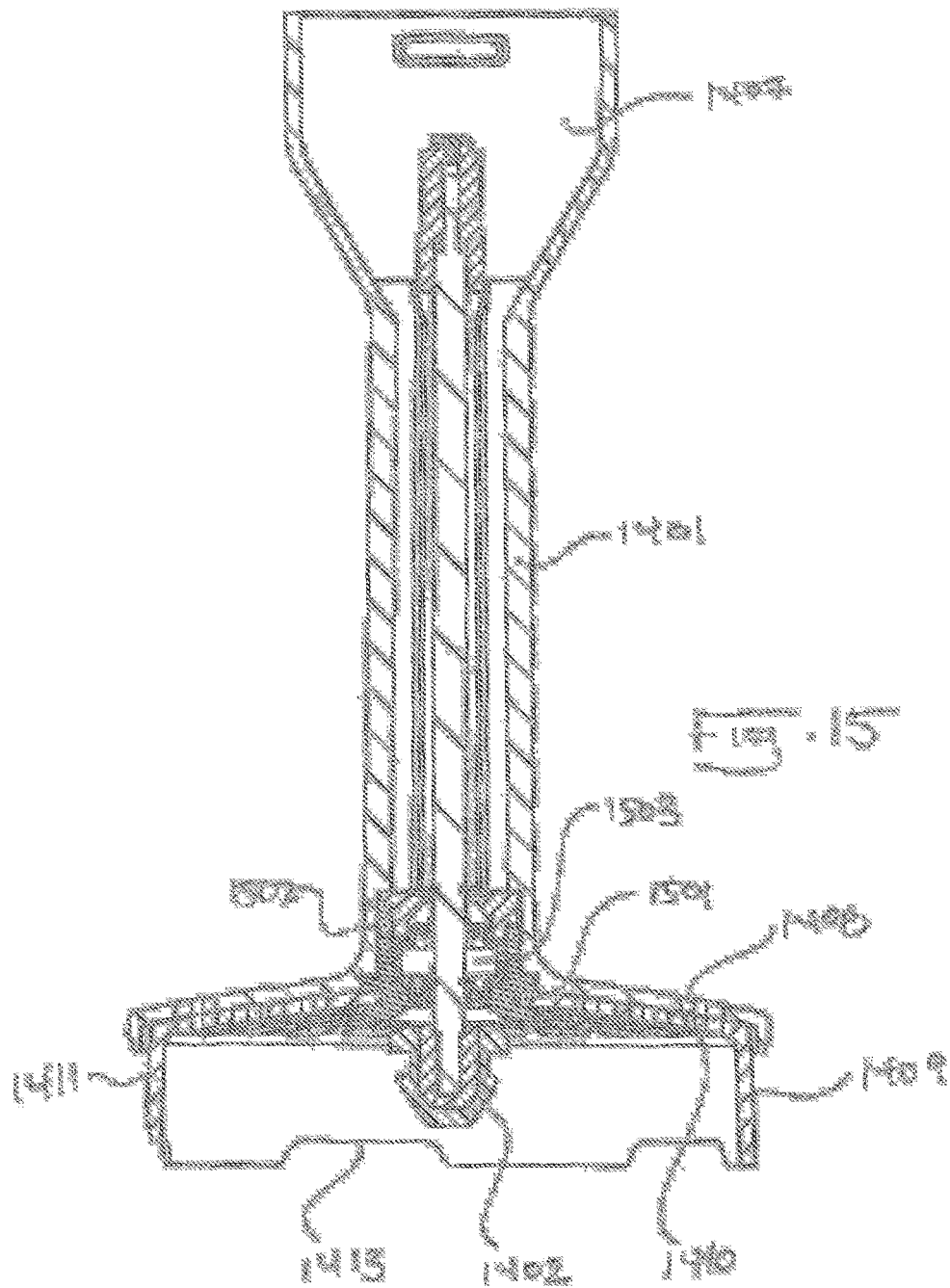

POTATO RICER

FIELD OF THE INVENTION

In invention relates to potato mashers and more particularly to a ricer or potato mashing accessory for a motorised hand held mixer or stick mixer.

BACKGROUND OF THE INVENTION

A stick mixer Is a hand held electrical mixer with a rotating blade. The blade is located at one end of a removable leg. The leg is generally waterproof and maybe submerged or dishwasher cleaned. Accessories have been developed to utilise the motor housing of a stick mixer for various purposes.

The present invention provides a ricer or potato mashing or ricing accessory incorporated into the leg of a stick mixer.

OBJECTS AND SUMMARY OF THE INVENTION

It is an object of the invention to provide a ricer or potato ricing accessory that is adapted cooperate with a stick mixer motor housing.

It is another object of the invention to provide a ricer or potato ricing accessory with variable aperture size.

Accordingly, there is provided an accessory for a stick mixer comprising a coupling portion with an optional internal gearbox. In one embodiment, a leg assembly further comprises nested inner and outer legs. The inner leg carries a first array of openings and the outer leg carries a second array of openings. The inner and outer legs rotate relative to one another to produce third array of openings having variable sizes.

In preferred embodiments a shaft extends through I He leg assembly and is adapted to connect, the gearbox to a blade that forces food upward through, the third array.

BRIEF DESCRIPTION OF THE DRAWING FIGURES

In order that the invention be better understood, reference is now made to the following drawing figures in which:

FIG. 15 is a cross sectional view of the device depicted in FIG. 4.

BEST MODE AND OTHER EMBODIMENTS

A potato ricer generally comprises a plate in which through openings are formed. Utilising a variety of different techniques, a food such as a cooked potato is forced through the openings. Some manually operated potato mashers or ricers utilise a pair of adjacent plates, each having an array of through openings. The plates can be rotated or indexed relative to one another to result in an array of openings that are either the same or smaller than the openings in either plate.

Figure 1:
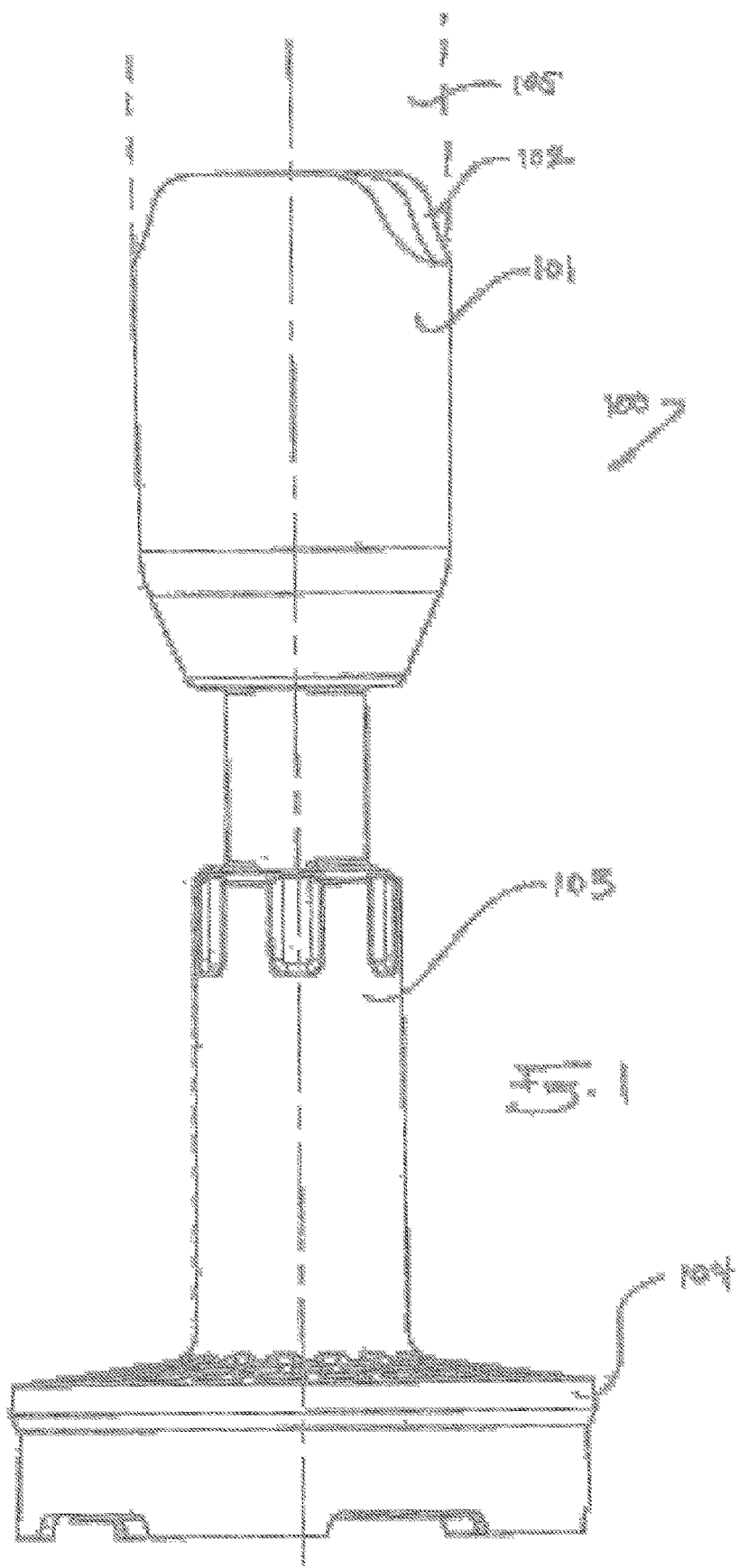
FIG. 1 is a side elevation of a leg for a stick mixer incorporating a ricer or potato masher.

An accessory for a stick mixer, as shown in FIG. 1, comprises a leg assembly 100. The leg assembly 100 further comprises an optionally detachable coupling portion 101 that houses an optional speed reducing gearbox. The coupling portion mi has an upper rim and edge 102 that is adapted to mechanically cooperate with the motor housing 105 of a stick mixer motor housing. The coupling portion is also connectable to a pair of nested or concentric inner and outer legs 103 that extends between the coupling portion 101 and a protective axial blade shroud 104 that surrounds a rotating blade.

Figure 2:
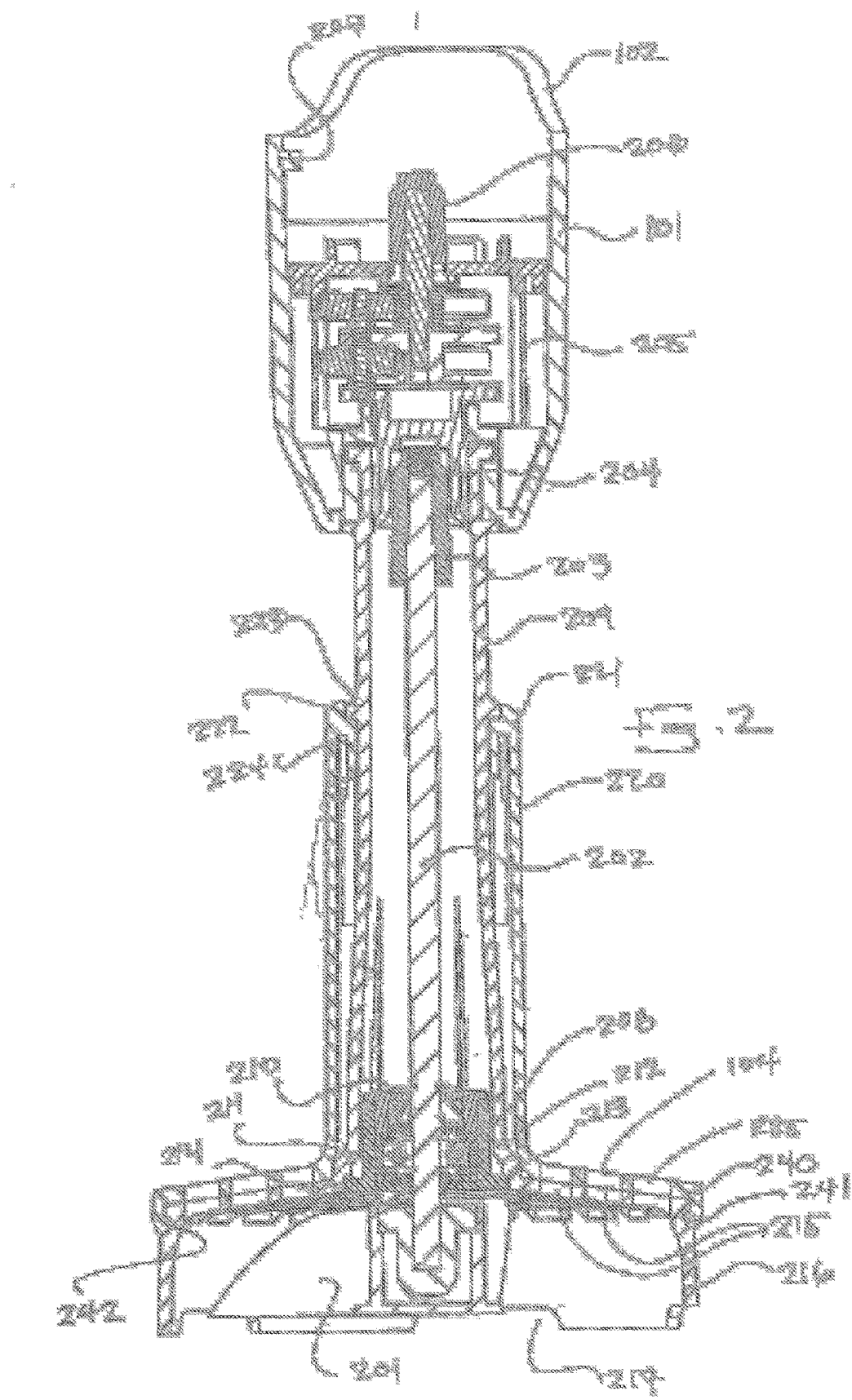
FIG. 2 is a cross sectional view of the device depicted in FIG. 1.

As shown in FIG. 2 the shroud 104 acts as a protective housing for a rotating blade 201. The blade 201 is driven by a drive shaft 202. The blade 201 forces food upward through the openings. In this example, the shaft 202 terminates, at one end in a male spline 203 that is received by a cooperating splined bore 204. The splined bore 204 is the output of (for example) a planetary gearbox 205. The gearbox 205 is contained within the outer walls of the coupling portion 101. The gearbox's input is a splined stub shaft 206 that is received by a coupling on the motor carried by the motor housing of a stick mixer 105. The undulating upper edge 102 of the coupling and its male bayonet features 207 are adapted to cooperate with corresponding surfaces and features of the stick mixer's motor housing 105.

Figure 3:
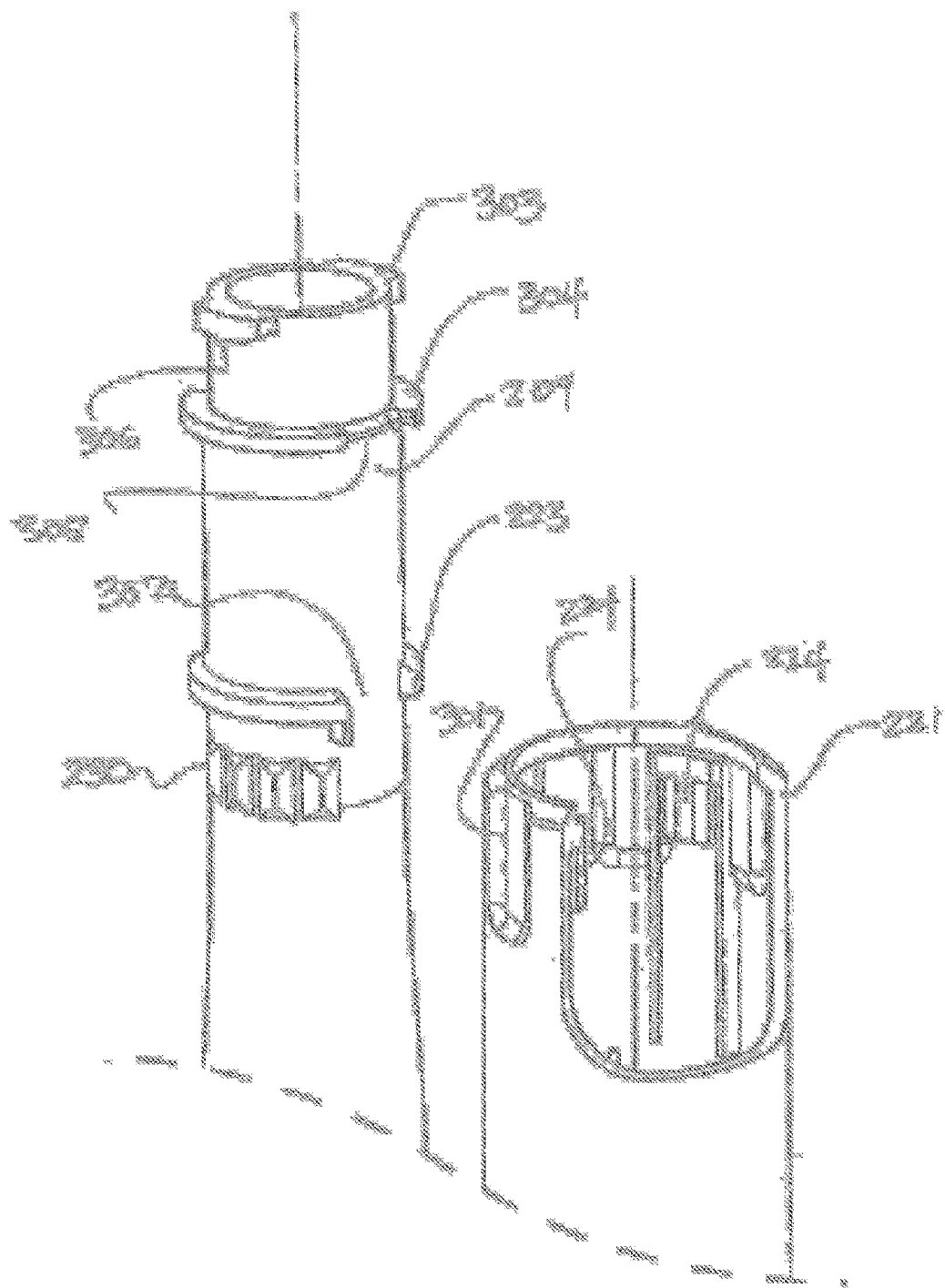
FIG. 3 are perspective view details of the top of the inner and outer legs of the device depicted in FIGS. 1 and 2.
Figure 4:
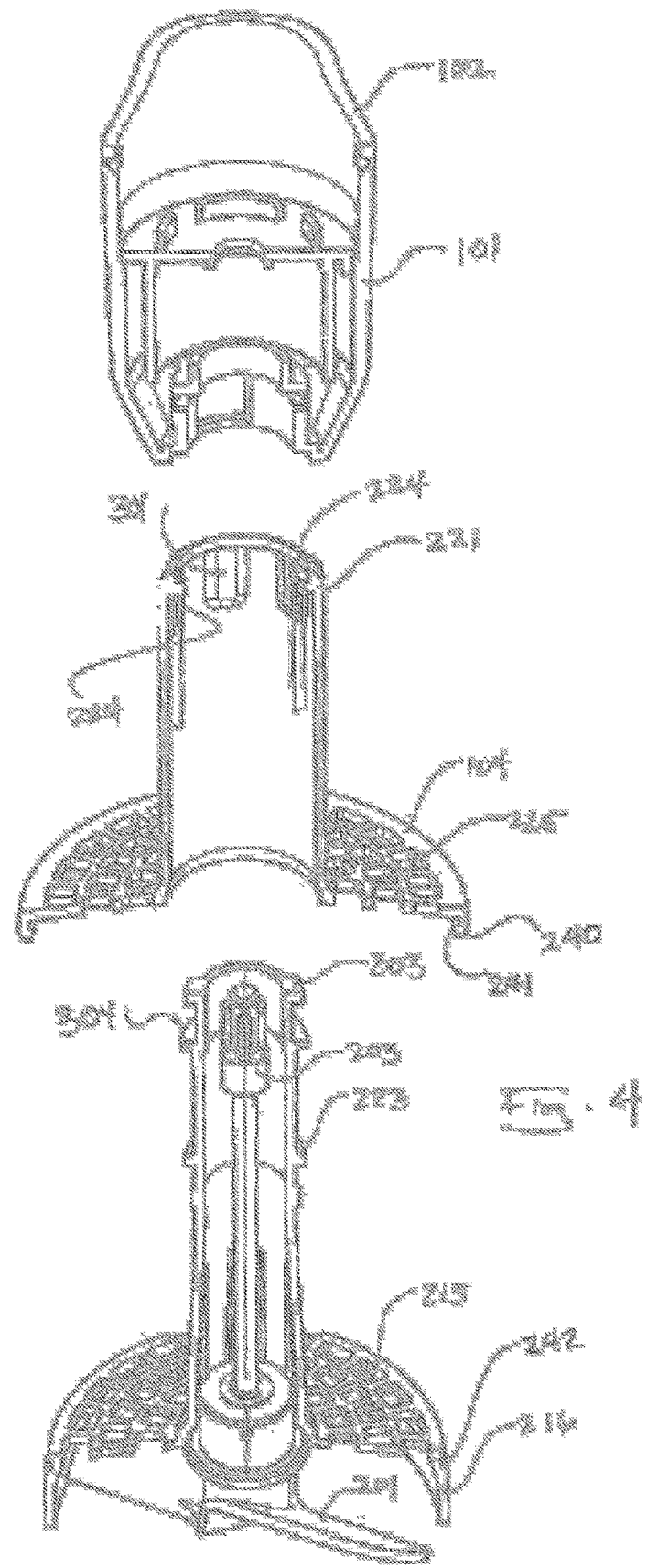
FIG. 4 is an exploded perspective of the device depicted in FIGS. 1-3.

In the example of FIGS. 2-4, the lower end of the drive shaft 202 is stabilised by a sealed bearing housing 208. The bearing housing fits within the lower portion of the generally cylindrical and fixed inner leg 209. The bearing housing 208 contains a pair of diaphragm seals 210, 211 between which is located a shaft bearing 212. The bearing housing 208 has a lower flange 213 that is retained in a cooperating shoulder 214 formed in a lower extent of the inner leg 209. The fitting of the bearing housing into the inner leg and its internal seals 210, 211 prevent moisture and debris from entering the interior of the inner leg 209 from the lower end of the inner leg.

A lower portion of the fixed or inner leg incorporates a flare or preferably integral flange that carries and comprises a first array of through openings 215. The flange and first array 215 in this example are formed as a disc-like web having a descending generally cylindrical rim 216 forming a protective blade shroud. The lower edge of the shroud is provided with a plurality of spaced apart arch-like recesses or scallops 217.

A concentric outer leg 220 surrounds and cooperates with the inner leg 209. The outer leg is provided with an upper rim 221 in which is formed a step 222 for receiving a circumferential bead 223 that is part of the exterior of the inner leg. A pair of resilient or flexible tongues 224 descends from the rim area of the outer leg 221. They extend toward and engage protrusions 230 that are formed circumferentially about the inner leg. The cooperation between the tongues 224 and the protrusions 230 provide calibrated click-stops or mechanical indexing features that are removed form the food contacting portions such as the shroud 216 and provide optional haptic and auditory feedback regarding the radial displacement or indexing between the inner and outer legs 209, 220.

The outer leg terminates in a disc-like flare or flange with a second array of through openings 225. In this example, the configuration, spacing and size of the openings in the first array and the second array are similar. Thus, when the first and second arrays are superimposed, the resulting through openings form a third array of openings. The opening of the third array are at a maximum open cross-sectional area when the first and second arrays are aligned or superimposed with one another. Relative rotation between the first and second legs causes the effective cross-sectional area of the through openings of the third array to vary.

As shown in FIGS. 3 and 4, the upper rim 220 of the rotating or outer leg is provided with scallops, grooves or other friction increasing grip features 301 that provide the user with additional grip traction in this area. It can also been seen that the circumferential bead 223 on the exterior of the inner leg 209 is provided with a gap 302 that allows (when the parts are aligned) the upward withdrawal and disassembly of the outer leg. The upper end of the fixed or inner leg 209 is provided with a pair of opposing male bayonet features 303 and a guide flange 304. The guide flange has a pair of gaps 305 that are oriented at approximately 90 degrees to the male bayonet features 303. This allows the upper end of the inner leg to be inserted into the coupling, then rotated and removeably retained in a stable operative position. The male bayonet features 303 may have downward extending nibs 306 that cooperate with detents in the coupling for providing additional feedback to the user regarding the installation of the leg assembly.

Figure 5:
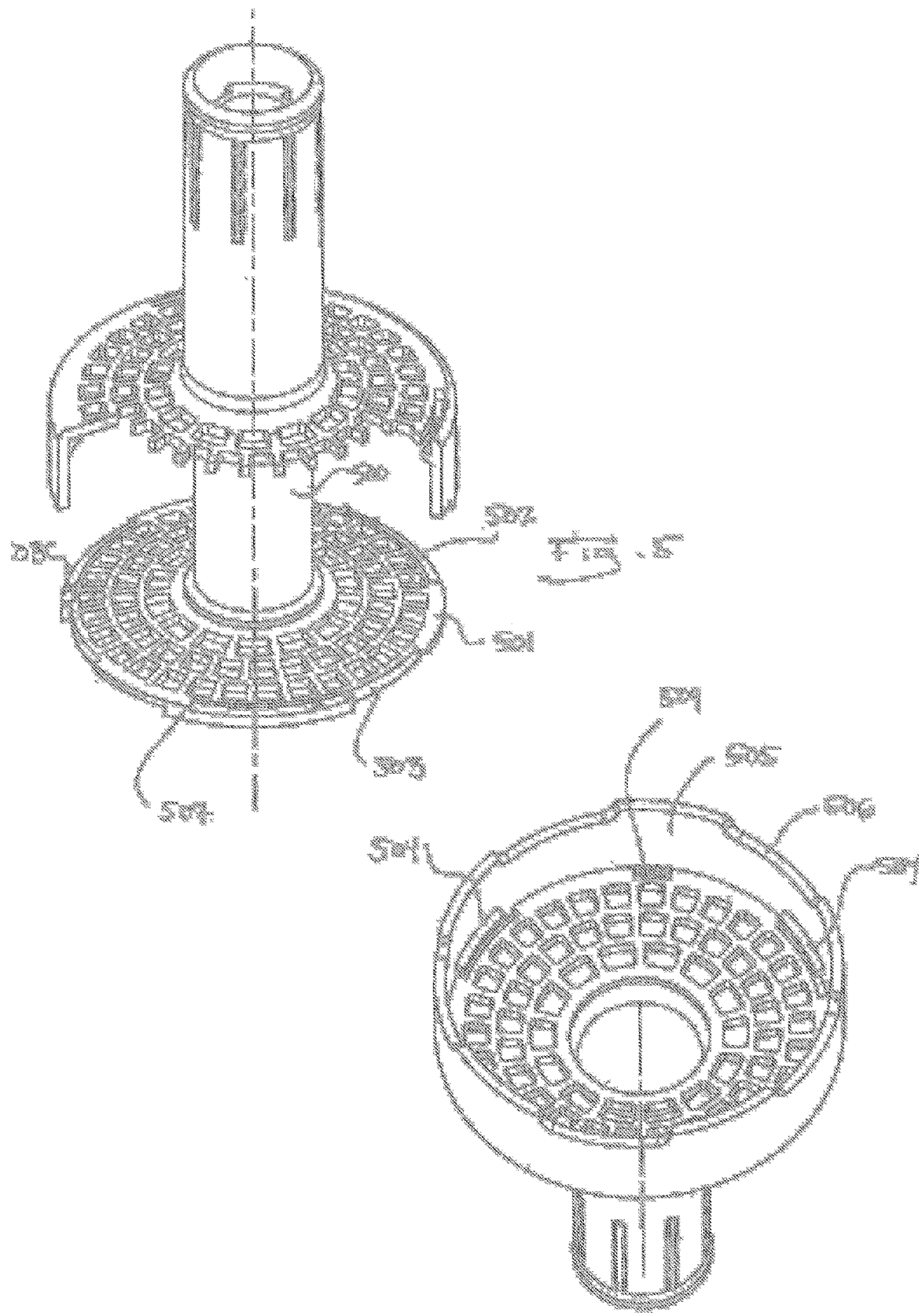
FIG. 5 are perspective views of another embodiment of the technology.

A different way of indexing the nested inner and outer legs and the first and second arrays is shown in FIG. 5. In this example, the inner leg 500 terminates in a disc-dike flare or flange 501 that carries the first array of through openings 502. The rim of the flange 501 has edge recesses 503 that cooperate with inward facing circumferential tabs 504 formed within the sidewall 505 of the shroud 506 associated with the outer leg. When the inner leg is fully inserted into the outer leg, the recesses 503 pass over the tabs 504. Subsequent rotation causes the rim 507 of the flange 501 to slide under the tabs 504. The rim 507 of the inner leg also has upright nibs or tabs 508 that cooperate with one or more detent arrays 509 located on the underside of the second array. The tabs 508 and detents 509 are in registry when the inner and outer legs are assembled and provide index feedback.

Figure 6:
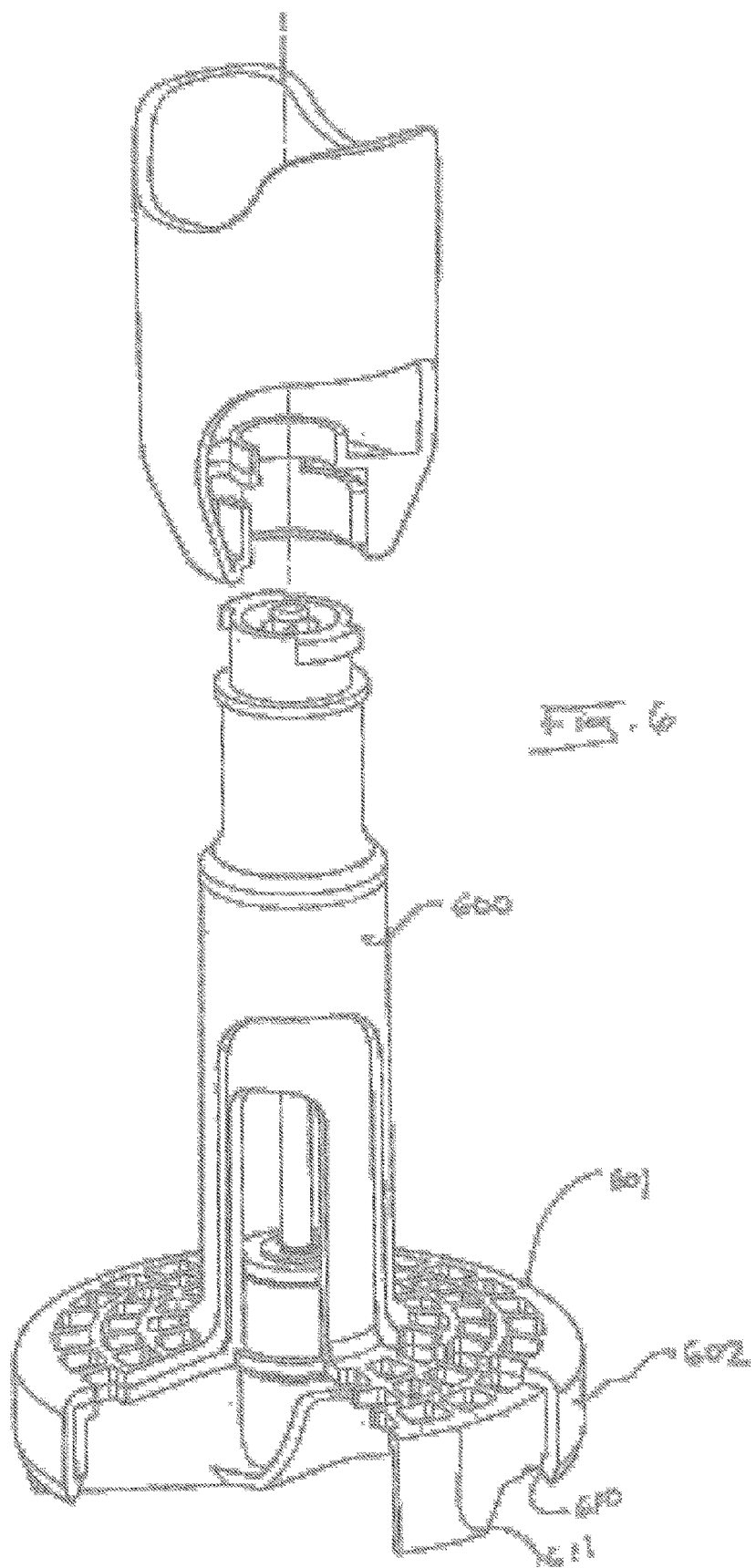
FIG. 6 is an exploded perspective view, partially sectioned, of a further embodiment.
Figure 7:
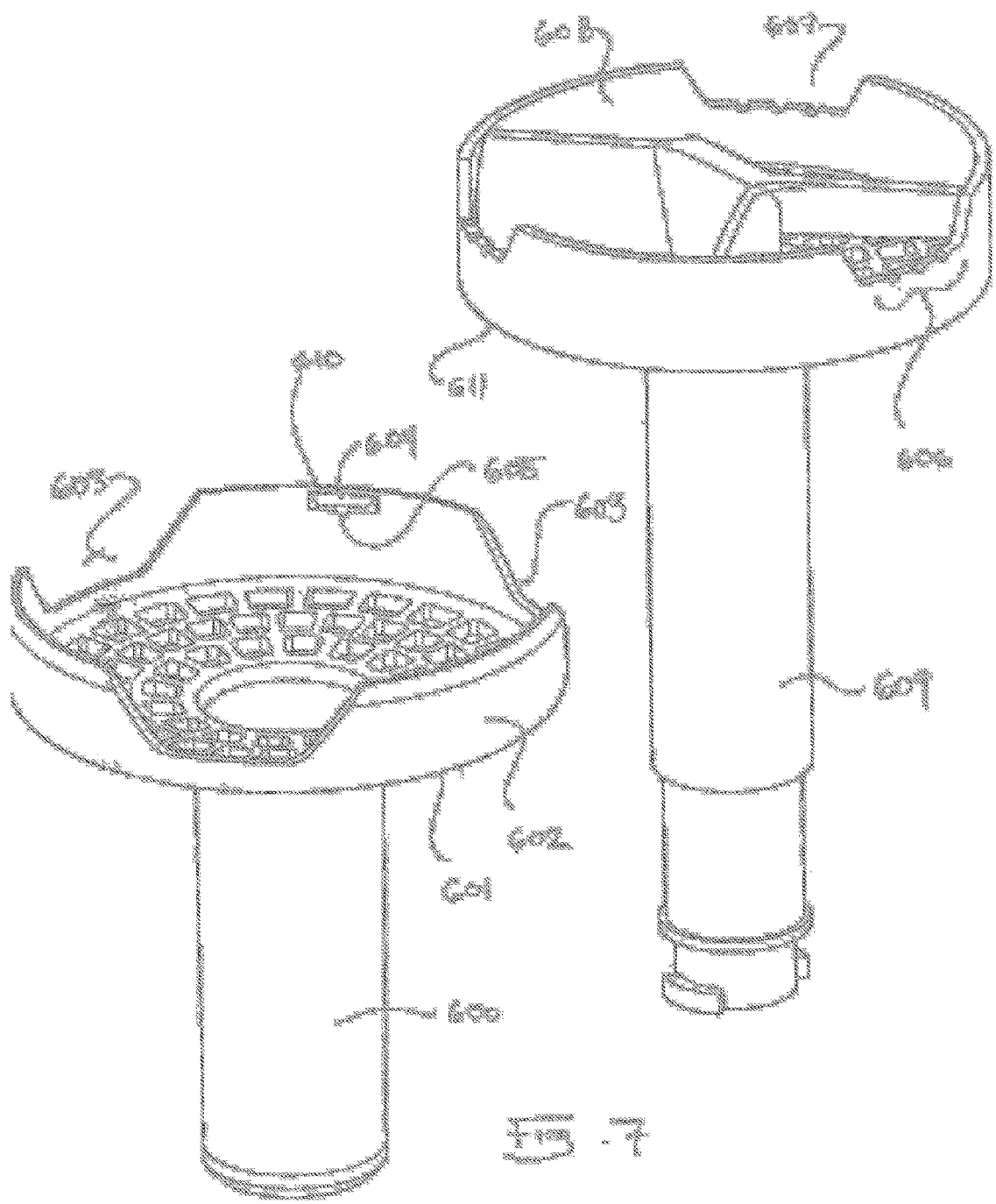
FIG. 7 are inverted perspective views of the inner and outer legs depicted in FIG. 6.
Figure 8:
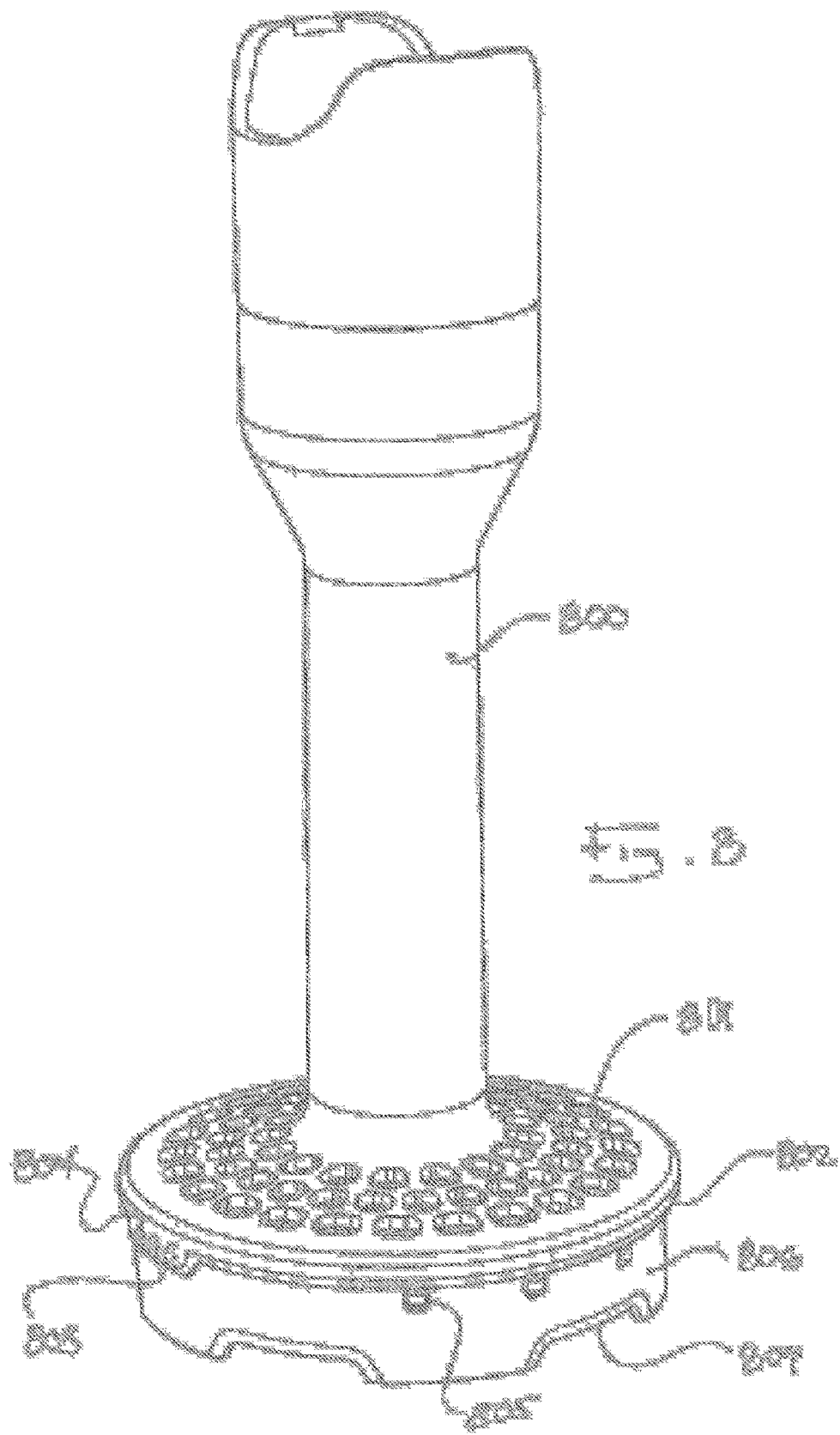
FIG. 8 is a perspective view of another embodiment.

Another way of mechanically arrays of opening on the indexing the concentric inner and outer legs is depicted in FIGS. 6 and 7. In this example, the outer leg 600 carries a first axial shroud 601 with a descending rim 602. The rim 602 is provided with a plurality of generally equally spaced recesses 603. In the area between the recesses 603 internal tabs 604 are provided. In preferred embodiments, each tab 604 has an upwardly extending indexing nib 605. The tab and nib 604, 605 extend toward and cooperate with arrays of detents 606 provided along the upper margin of second recesses 607 formed around the descending run or shroud 608 of the inner leg 609. Each tab 604 has a tapered or inclined lower surface 610 that glides over the peripheral shoulder 611 of the inner leg's shroud, thus capturing the inner leg when the inner and outer legs are assembled. The inner leg may be removed by outward flexing of the sections located between the recesses 603. In this example, each shroud has three recesses 603, 607 and each recess of the inner leg is provided with three index detents 606. This arrangement provides for three different index locations and three different indexed aperture sizes. It will be appreciated that with respect to mechanical indexing features, the relative position of male and female features may be reversed.

It will be appreciated that various forms of mechanical indexing may be provided with mechanical features that extend between the first and second arrays.

A further and preferred embodiment of the leg assembly of the present technology is depicted in FIG. 8-13. In this embodiment, the outer leg 800 carries a first array of openings 801 that is bounded by a circumferential rim 802. A lower edge of the rim 802 carries one or more deepened or enlarged portions 803. At least one enlarged portion 803 has an arrangement of two or more internal indexing recesses or detents 804. Those inward facing detents 804 cooperate with protruding, rounded features or ribs 805 located, in registry with the detents or dimples 804, on an exterior surface of the shroud 806 associated with and formed around the array of openings on the inner leg. The lower edge of the shroud 806 has arch-dike recesses or scallops 807 along its lowest edge. In this example, the rim 802 of the outer leg does not extend past the protrusions 805.

Figure 9:
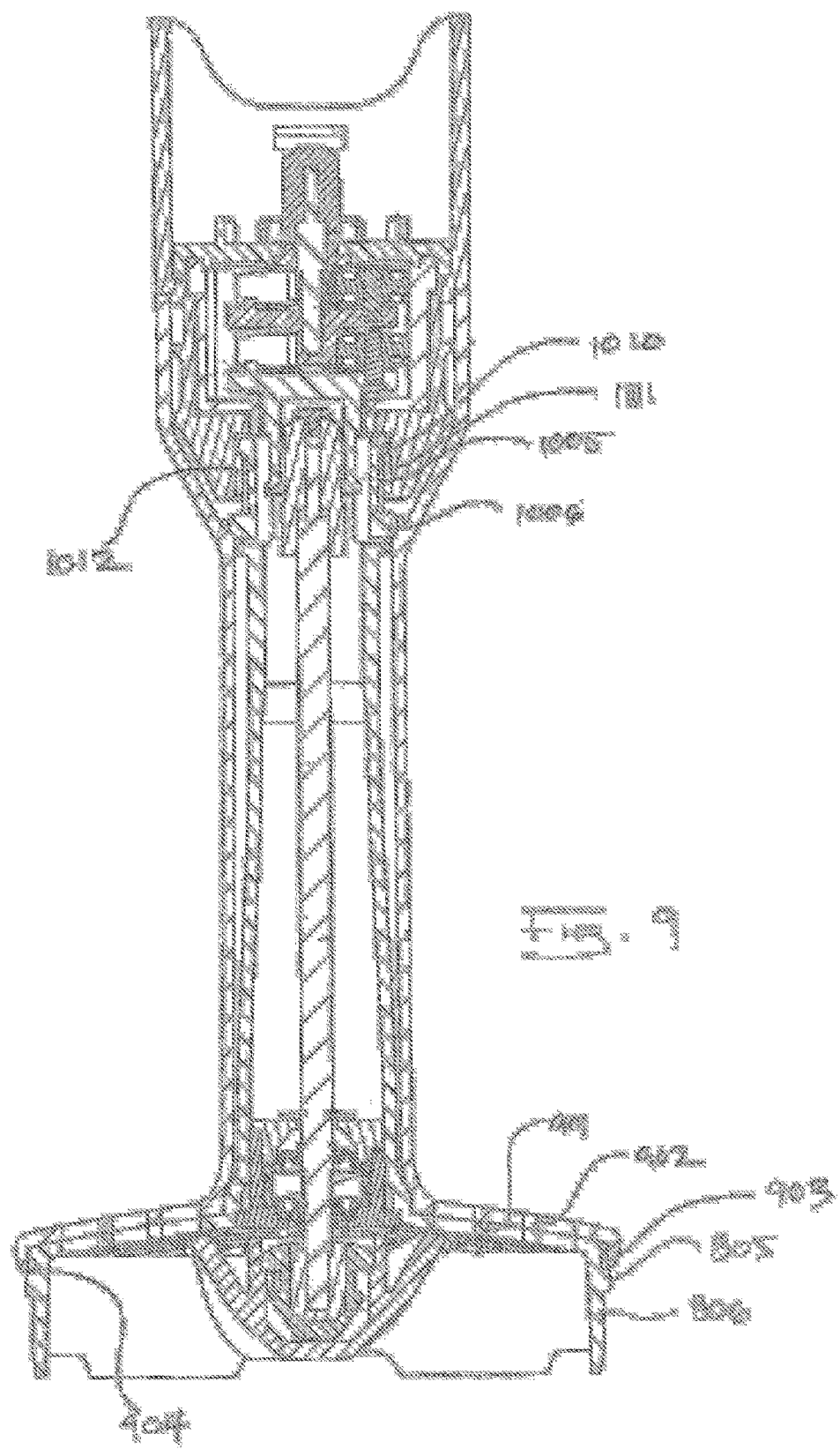
FIG. 9 is a cross sectional view of the device depicted in FIG. 8.

As shown in FIG. 9, the first and second arrays 901, 902 are kept in close proximity be engaging an overhanging portion or lip 903 of the second array 902 with a circumferential groove 904 formed around an upper portion of the shroud 806. The ribs 805 are formed below the groove 904 so that the inwardly directed lip 903 does not interfere with the ribs 805.

Figure 10:
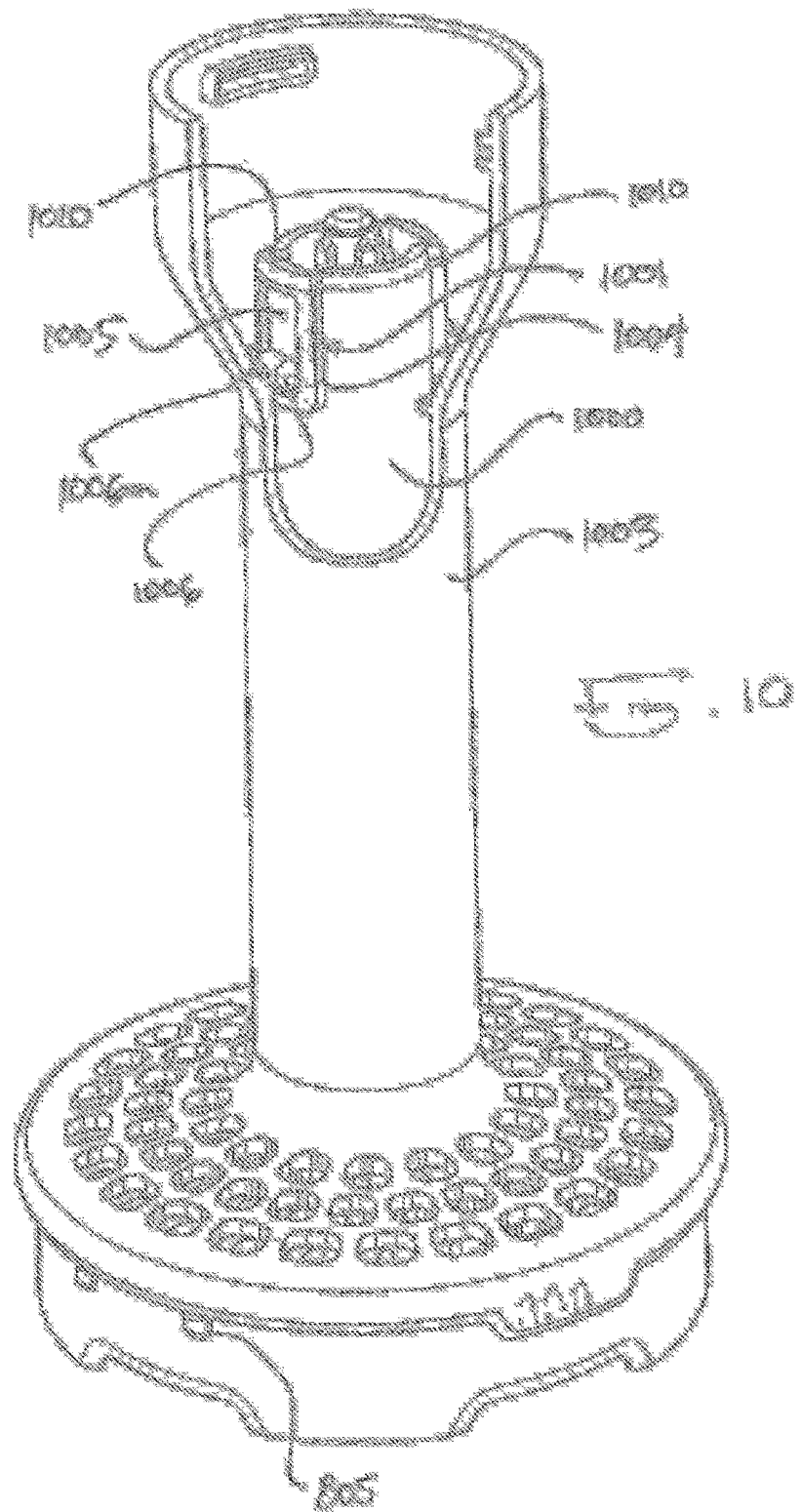
FIG. 10 is a perspective view of the device depicted in FIG. 9. partially section to show the interconnection between the inner and out legs.
Figure 11:
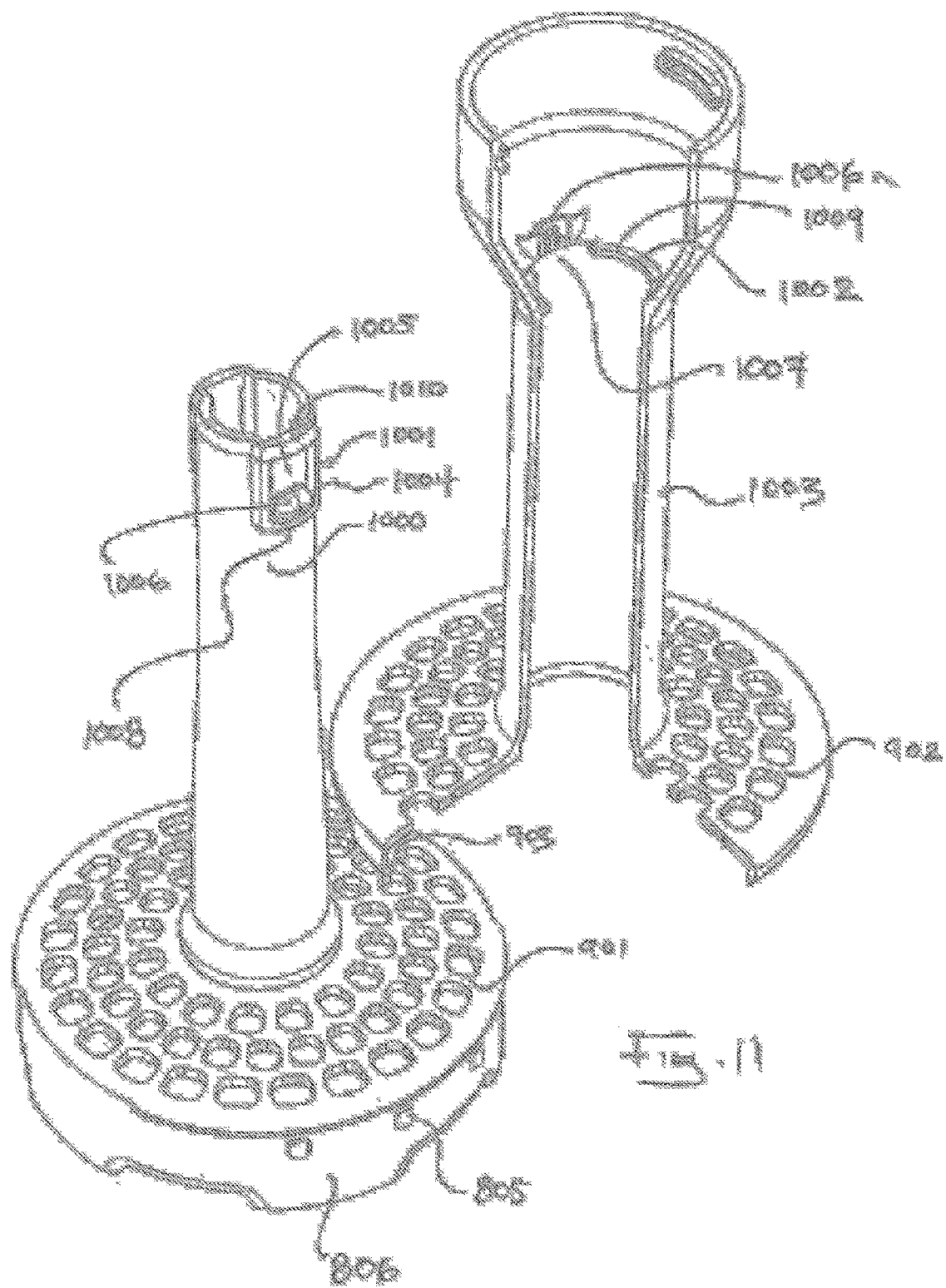
FIG. 11 is a perspective view of the inner and outer legs depicted in FIG. 10, disassembled for clarity.

As shown in FIGS. 10 and 11, the upper extent of the inner leg 1000 comprises a male bayonet feature 1001 that engages with the female bayonet feature 1002 located around a cooperating portion of the outer leg 1003. The male bayonet feature 1001 of the inner leg further comprises a protruding rectangular surround 1004 within which is located a resilient, flexible tongue 1005. The tongue 1005 has a bulge or protrusion 1006 at its lower end that is received by a saddle 1006 located adjacent to the gap 1007 associated with the female bayonet feature 1002 of the outer leg 1003. The saddle 1006 temporarily restrains the protrusion 1006 and provides haptic Feedback to the user that the inner leg has been fully inserted passed the female bayonet feature 1002. The saddle 1006 conforms to the shape of the protrusion 1006 and allows it to be temporarily seated in a stable orientation pending the relative rotation between the inner and outer legs that locks them together. The locking together of the inner and outer legs in accomplished when an underside 1008 is rotated into position above the inwardly directed rim 1009 of the female bayonet feature 1002. As will be explained, this locking together is a accomplished when the leg assembly 1000, 1003 is engaged with the coupling portion and its gearbox 1300 (See FIG. 13).

An upper portion of the male bayonet feature 1001 further comprises an overhanging lip 1010 that is captured by an inwardly directed lip 1011 formed within a receiving bore 1012 into which the inner leg is inserted during assembly (See FIG. 9). In this example, the flexible tongue 1005 is attached by its upper margin to a portion of the surround 1001 located adjacent to the protruding lip 1010. Thus the tongue 1005 pivots about a horizontal axis, in to and out of engagement with the saddle 1006.

Figure 12:
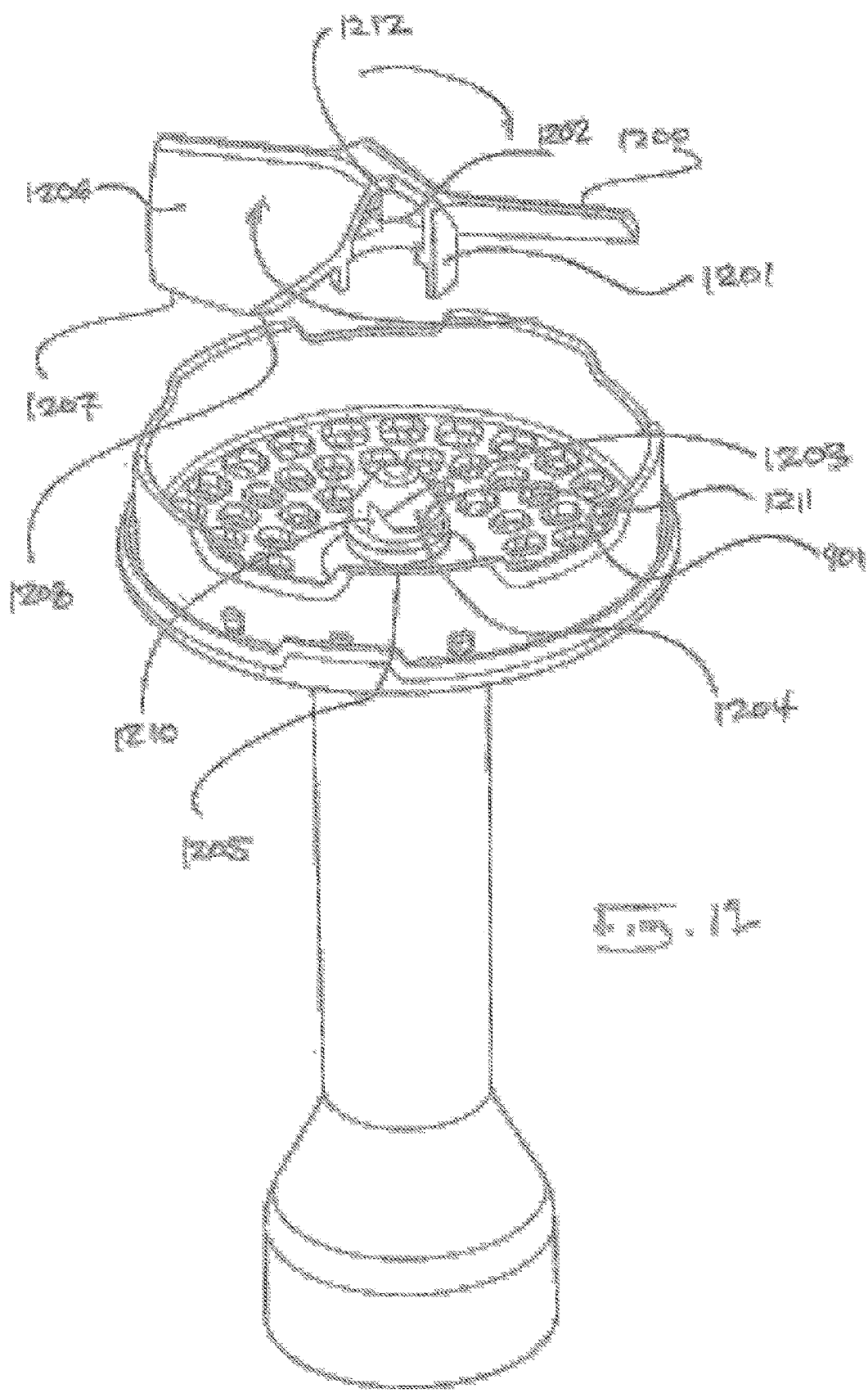
FIG. 12 is an inverted perspective view of the device depicted in FIG. 10.

As shown in FIG. 12, the blade 1200 associated with the ricer or potato masher comprises a female hub or coupling portion 1201 within which is located one or more male bayonet features 1202 that engage with female bayonet features 1203 associated with the cone shaped hub 1204 carried by the shaft 1205. In this example, the blade hub 1201 carries 2 blades 1206, each blade having a sharp upper edge 1207 with a flattened upper surface 1208 that contacts the underside of the first array 901. When the shaft 1205 is rotated the blade wipes or urges food matter through the first and second arrays 901, 902. The female bayonet feature 1203 is tapered from a wider mouth opening 1210 to a narrower terminal portion. The female bayonet feature 1203 has a notch 1211 that cooperates with a nib 1212 formed on a lower surface of the internal tab 1202. This provides haptic feedback to the user that the blade 1200 is duly engaged with the male hub 1204.

Figure 13:
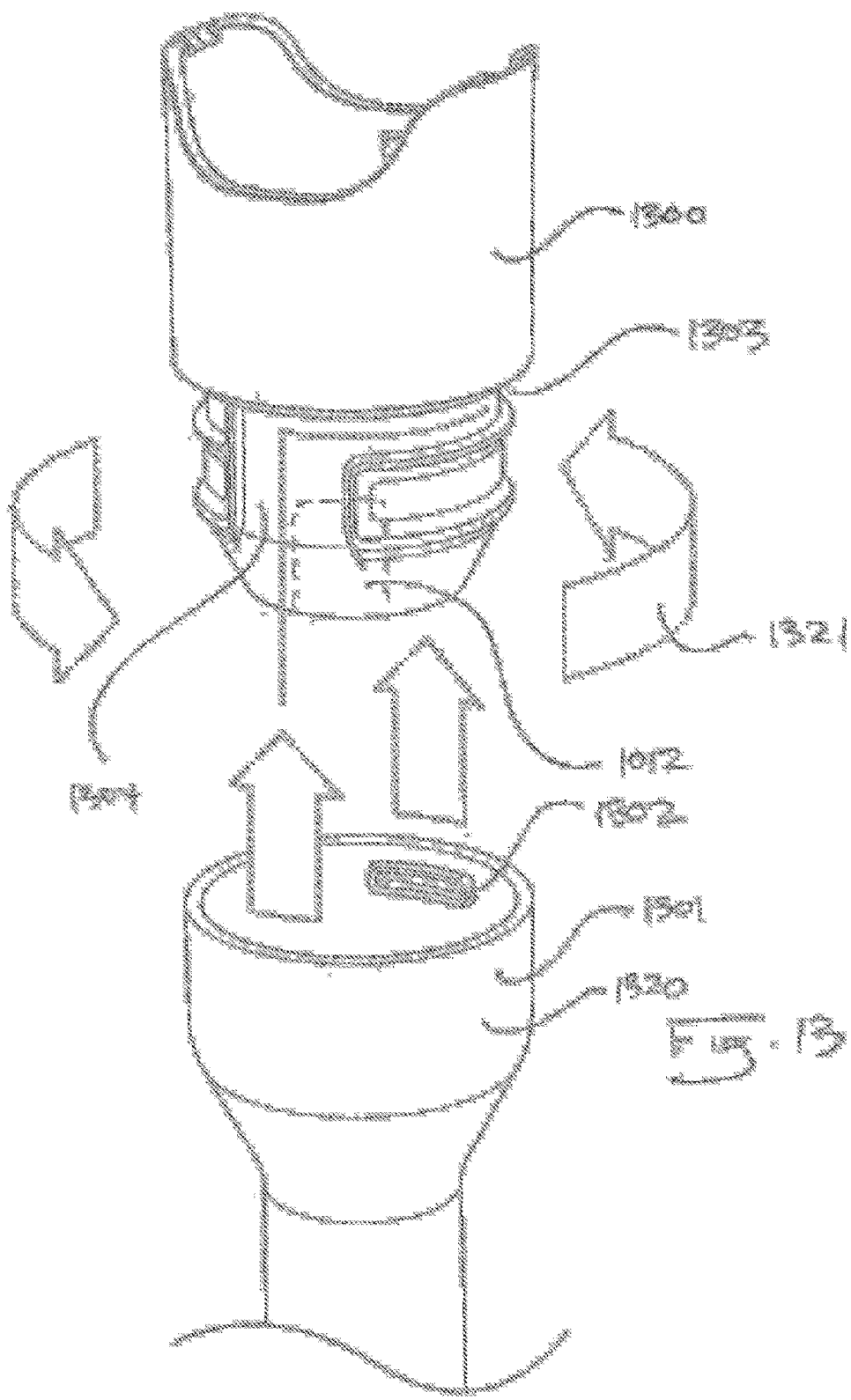
FIG. 13 is an exploded perspective view of the upper portion of a leg cooperating with a coupling portion having an internal gearbox.

As shown in FIG. 13, the outer link portion 1301 includes an inwardly directed male bayonet feature 1302 that engages with cooperating female bayonet feature 1303 formed on a reduced diameter portion 1304 associated with the coupling portion and gearbox 1300. The leg assembly is first assembled by inserting the inner leg into the outer leg. This engages the protrusion 1006 with the saddle 1006 with the protrusion and saddle engaged, the enlarged bell-like portion 1320 of the outer leg is first inserted over the female coupling portion 1303 then rotated 1321 causing the inner leg, outer leg and coupling portion to engage with one another.

Figure 14:
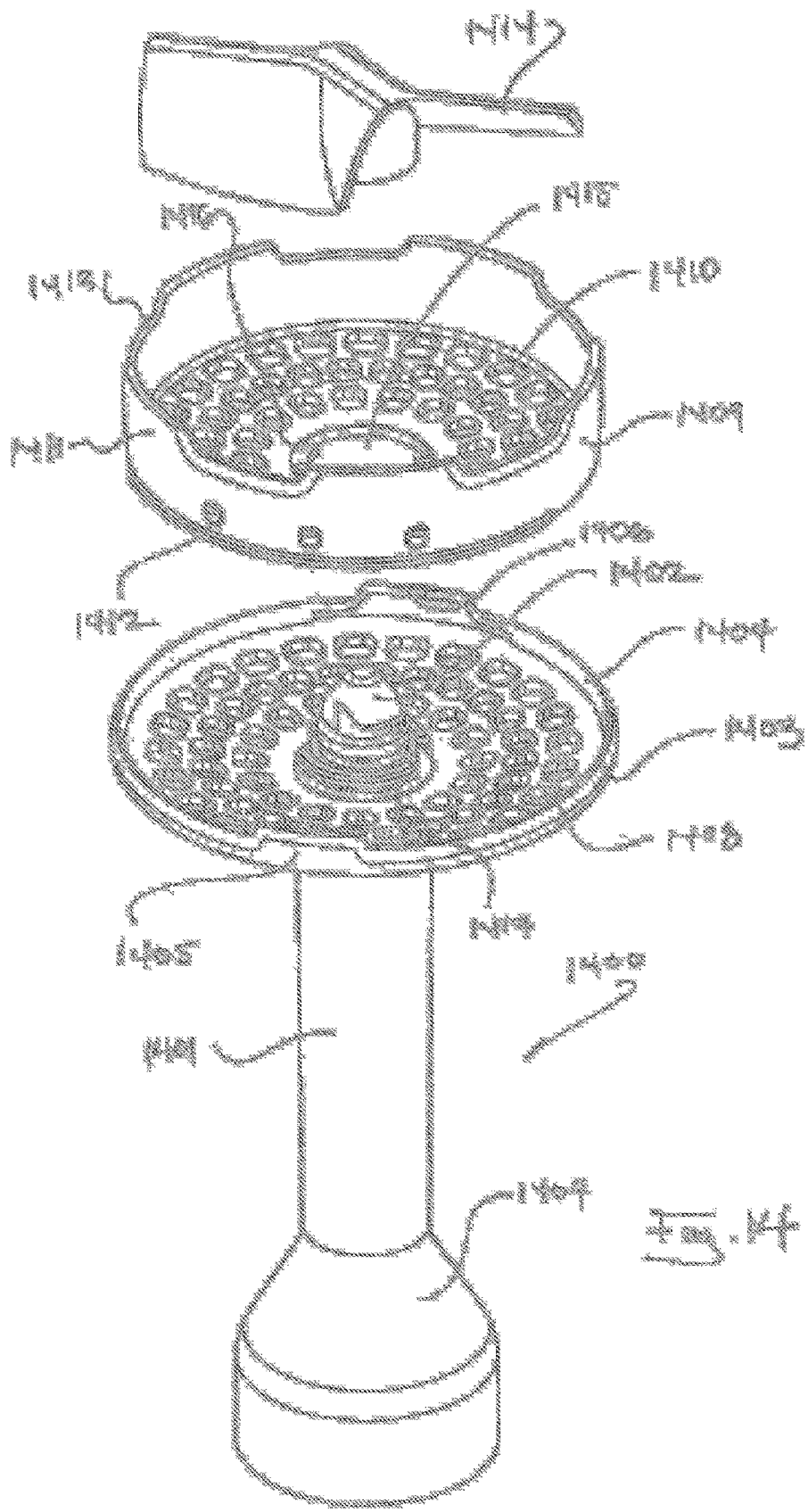
FIG. 14 is an inverted perspective view, exploded to illustrate another embodiment.

A further embodiment is depicted in FIG. 14. In this embodiment, the leg assembly (depicted without its gearbox) comprises a single hollow leg 1401 through which a shaft extends to drive a rotating blade coupling 1402. The leg 1401 terminates in a flare or flange 1403 that is surrounded by an axially extended rim 1404. The rim includes or supports a pair of opposed mechanical indexing features 1405, each having a detent 1406. The other end of the leg 1401 forms a bell with an internal bayonet feature 1407 for attachment to the leg assembly's coupling portion with its internal gearbox. The flange 1403 has a first array of through openings 1408.

The flange 1403 cooperates with a second flange 1409. The second flange 1409 has a second array of through openings 1410 that cooperate with the first array 1409 to provide a third array through openings of adjustable size. The second flange 1409 has a surrounding sidewall 1411 that is longer (or deeper) than the rim 1403 and thus projects beyond it when installed. The sidewall features exterior protrusions or bumps 1412 that extend toward and cooperate with the detents 1406 to provide haptic feedback and indexing of the first and second arrays 1408, 1410. The lower rim of the sidewall 1411 has recesses 1413 that allow food materials to enter the area of the blade 1414. The second flange 1409 has a central bore 1415 that in this example has inwardly directed ears 1416. The ears cooperate with a flange with female bayonet features 1417 that is located below the permanently installed blade coupling 1402. Thus, the second flange 1409 is installed on the leg by aligning the ears 1416 with the opening in the flange 1417 and advancing the second flange until the keys or ears 1416 can be rotated into position below the flange 1417. After the second flange 1409 is installed, the blade 1414 can be bayoneted, screwed or otherwise attached to the blade coupling 1402.

FIG. 15 illustrates the retention of the inner edge or diameter 1501 of the second flange 1409 by a groove formed in a lower end of a housing 1502 for the shaft bearings 1503 that is permanently installed at the lower end of the leg 1401. The user can index the first and second arrays 1408, 1410 by gripping the sidewall 1411 of the second flange and rotating it. The second, flange may be mounted in other ways.

Although the invention has been described with reference to specific examples, it will be appreciated by those skilled in the art that the invention may be embodied in many other forms.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. Features of any embodiment can be used in any reasonable combination.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention.

While the present invention has been disclosed with reference to particular details of construction, these should be understood as having been provided by way of example and not as limitations to the scope or spirit of the invention.

What is claimed is:

1. A ricing device for attachment to a motor housing of an electric mixer, the device comprising:
 a coupling portion; and
 an inner leg and an outer leg that extend from the coupling portion to a blade shroud;
 the inner leg terminating in a first array of openings and the outer leg terminating in a second array of openings;
 the first and second arrays being rotatable relative to one another to form a third array of openings different from the first and second arrays of openings;
 a drive shaft extending from a blade located within the blade shroud through the inner leg,
 wherein a cross-sectional area of the third array of openings is governed between two or more values by mechanical indexing features that are associated with the first and second arrays of openings, and wherein the mechanical indexing features comprise one or more detents carried by the outer leg and the inner leg extends within the outer leg by a first distance co-axially with the drive shaft before the blade shroud, the first distance being larger than a diameter of the blade shroud.

2. The ricing device of claim 1, wherein the coupling portion contains a speed reducing gearbox.

3. The ricing device of claim 2, wherein the coupling portion is detachable from the inner and outer legs.

4. The ricing device of claim 1, wherein a cross-sectional area of the third array of openings is governed by the mechanical indexing features that extend between the inner leg and outer leg.

5. The ricing device of claim 1, wherein the blade shroud is axial and formed around the first array; the second array has a circumferential lip that engages a circumferential groove formed around the shroud.

6. The ricing device of claim 1, wherein the blade has an upper edge that contacts a lower edge of the first array; and rotation of the blade acts to force food through the first and second arrays.

7. The ricing device of claim 6, wherein the drive shaft terminates in a coupling and the blade attaches to the coupling.

8. The ricing device of claim 1, further comprising a motor housing that is removable attachable to the coupling portion.

9. The ricing device of claim 1, wherein the mechanical indexing features further comprise one or more ribs carried by the inner leg that cooperate with the one or more detents.

* * * * *